United States Patent [19]

Strother

[11] 4,051,013

[45] * Sept. 27, 1977

[54] FLUID CATALYTIC CRACKING PROCESS FOR UPGRADING A GASOLINE-RANGE FEED

[75] Inventor: Charles W. Strother, Arlington Heights, Ill.

[73] Assignee: UOP Inc., Des Plaines, Ill.

[*] Notice: The portion of the term of this patent subsequent to Apr. 6, 1993, has been disclaimed.

[21] Appl. No.: 637,446

[22] Filed: Dec. 3, 1975

Related U.S. Application Data

[63] Continuation of Ser. No. 361,911, May 21, 1973, Pat. No. 3,948,757.

[51] Int. Cl.$^2$ ............................................. C10G 37/02
[52] U.S. Cl. ................................... 208/78; 208/153; 208/156; 208/159; 208/164
[58] Field of Search .................. 208/74, 78, 164, 156, 208/159

[56] References Cited

U.S. PATENT DOCUMENTS

| | | | |
|---|---|---|---|
| 3,706,654 | 12/1972 | Bryson et al. | 208/164 |
| 3,844,973 | 10/1974 | Stine | 208/164 |
| 3,926,778 | 12/1975 | Owen et al. | 208/164 |
| 3,928,172 | 12/1975 | Davis et al. | 208/164 |
| 3,948,757 | 4/1976 | Strother | 208/113 |

Primary Examiner—Herbert Levine
Attorney, Agent, or Firm—James R. Hoatson, Jr.; Thomas K. McBride; William H. Page, II

[57] ABSTRACT

A fluid catalytic cracking process for simultaneously cracking a gas oil feed and upgrading a gasoline-range feed to produce high quality motor fuel. The gasoline-range feed is contacted with freshly regenerated catalyst in a relatively upstream portion of a short-time dilute-phase riser reaction zone maintained at first catalytic cracking conditions and the gas oil feed is contacted with used catalyst in a relatively downstream portion of the riser reaction zone which is maintained at second catalytic cracking conditions.

Particularly suited to efficiently cracking a gas oil feed and upgrading a wide variety of gasoline-range feed, including the more refractory of such feeds, is a fluid catalytic cracking process comprising a short-time dilute-phase riser reaction zone and a regeneration zone in which CO, produced by the oxidation of coke, is essentially completely oxidized to $CO_2$ and in which at least part of the heat of combustion is transferred to regenerated catalyst.

5 Claims, 2 Drawing Figures

FLUID CATALYTIC CRACKING PROCESS FOR UPGRADING A GASOLINE-RANGE FEED

CROSS-REFERENCE TO RELATED APPLICATIONS

This application is a continuation application of my prior copending application Ser. No. 361,911, filed May 21, 1973, now U.S. Pat. No. 3,948,757 all of the teachings of which are incorporated herein by specific reference thereto.

BACKGROUND OF THE INVENTION

1. Field of the Invention

The field of art to which this invention pertains is hydrocarbon processing. Specifically this invention relates to fluid catalytic cracking process for simultaneously cracking a gas oil feed and upgrading a gasoline-range feed to produce high quality motor fuel.

2. Prior Art

For years poor quality or hard to process gasoline-range streams such as coker, visbreaker, or pyrolysis naphtha have been charged to FCC units (or to gas concentration processes located downstream of FCC units) for the purpose of merely disposing of them rather than upgrading such materials. These materials when charged to the FCC process entered the process with the normal gas oil feed and were essentially converted to coke on catalyst in the relatively long residence time, dense bed reaction zones which are employed at the time. Alternatively, some of these gasoline-range materials passed through the reaction zone with little or no change in quality or composition.

The advent of higher activity catalysts and the use of short-time dilute-phase riser reaction zones has made it possible not only to more efficiently crack gas oil feed streams but possible to upgrade in the FCC process most of these gasoline-range materials into more valuable products rather than merely disposing of them. By separately contacting the gasoline-range feed and the gas oil feed with catalyst in different regions of a short-time riser reaction zone which are maintained at different cracking conditions a high quality high octane motor fuel can be produced. Since the refiner now has a method whereby he can economically upgrade low value gasoline-range streams the process of this invention is a profitable operation for the refiner. Upgrading of such gasoline streams, including the more refractory materials such as straight run gasoline, can be more efficiently achieved when the temperature of the freshly regenerated catalyst which contacts such feeds is increased. In one embodiment of the process of our invention the temperature of the regenerated catalyst is increased by employing a regeneration zone in which CO, resulting from the combustion of coke, is essentially completely combusted to $CO_2$ and in which heat of combustion of the CO is transferred to the regenerated catalyst.

The prior art has recognized that hydrogenation of these low octane, generally unstable gasoline-range streams improves their ability to be catalytically cracked. In U.S. Pat. No. 3,065,166 for instance, a heavy gasoline fraction (boiling range of about 350°–425° F.) is hydrogenated and contacted with hot regenerated catalyst from about 0.5 to 5 seconds in a separate reaction zone, distinct from the dense bed conversion zone wherein the FCC feed is cracked, for the purpose of reducing gas and coke formation and increasing the yield of 350° F. end point gasoline.

In the process of our invention the gasoline-range (having a boiling range of from about 100° F. to about 430° F.) feed without prior hydrogenation is contacted with freshly regenerated catalyst in a particular region of a short-time dilute-phase riser reaction zone for less than about 0.5 seconds for the purpose of upgrading the gasoline-range feed to produce stable high octane molar fuel. Additionally some amounts of coke and gas are produced so overall yields of the products from the reaction zone are somewhat increased rather than decreased. The normal FCC gas oil feeds then enters the same reaction zone but in a different region.

In U.S. Pat. No. 3,617,497 gasoline yield is enhanced by segregating normal FCC gas oil feed into a relatively low molecular weight gas oil feed stream and a relatively high molecular weight gas oil feed stream and charging the lower molecular weight fraction near the bottom of a transfer line reactor and the relatively higher molecular weight fraction progressively further up to the riser both in the presence of an added diluent vapor which reduces the partial pressure of the lower molecular weight fraction. No mention is made of upgrading a gasoline-range hydrocarbon feed. A gasoline-range hydrocarbon, if used at all, will be used as a diluent.

The prior art has neither recognized nor suggested the process of our invention.

SUMMARY OF THE INVENTION

It is accordingly, a broad objective of my invention to provide a fluid catalytic cracking process for simultaneously cracking a gas oil feed and upgrading a gasoline-range feed to produce high quality motor fuel. More specifically, another objective of my invention is to provide a fluid catalytic cracking process comprising a particular reaction zone and a particular regeneration zone for simultaneously and more efficiently cracking a gas oil feed and upgrading a gasoline-range feed to produce high quality motor fuel. The particular reaction zone is a short-time dilute-phase quick-quench riser reaction zone and the particular regeneration zone is one in which both coke on spent catalyst and CO, resulting from the oxidation of coke, are essentially completely oxidized and in which at least part of the heat of combustion of CO is transferred to the regenerated catalyst. It is a further objective to provide a specific regeneration zone in which both the oxidation of coke and CO and the transfer of heat of combustion to the regenerated catalyst can be effectively accomplished. A specific regeneration zone contains as components a first dense bed, a dilute phase transport riser and a second dense bed which operate in series to produce regenerated catalyst and spent regeneration gas containing essentially no CO. Coke oxidation takes place in the first dense bed producing regenerated and partially spent gas which contains CO. Regenerated catalyst and partially spent regenerated gas are then passed through the dilute phase transport riser wherein essentially complete conversion of CO takes place and heat of combustion of the CO is transferred to the catalyst passing through the transport riser.

In brief summary then, my invention is, in one embodiment a fluid catalytic cracking process which comprises the steps of: (a) contacting a gasoline-range feed with freshly regenerated catalyst in relatively upstream portion of a short-time dilute-phase riser reaction zone which portion is maintained at first catalytic cracking conditions; (b) contacting the gas oil feed with used catalyst in a relatively downstream portion of the riser reaction zone which portion is maintained at second catalytic cracking conditions; (c) passing catalyst and feed streams in admixture through the riser reaction zone to form spent catalyst, containing coke, and product components; (d) discharging the mixture from said reaction zone in separation means to effect the separation of spent catalyst from product components and any unreacted feed; (e) recovering product components and any unreacted feed; and (f) passing spent catalyst into a regeneration zone maintained at oxidizing conditions and therein oxidizing coke from said catalyst to produce freshly regenerated catalyst.

Other embodiments and objects of the present invention encompass details about the reaction zone and the regeneration zone all of which are hereinafter disclosed in the following discussion of each of these facets of the present invention.

DESCRIPTION OF THE DRAWING

Figure 1:
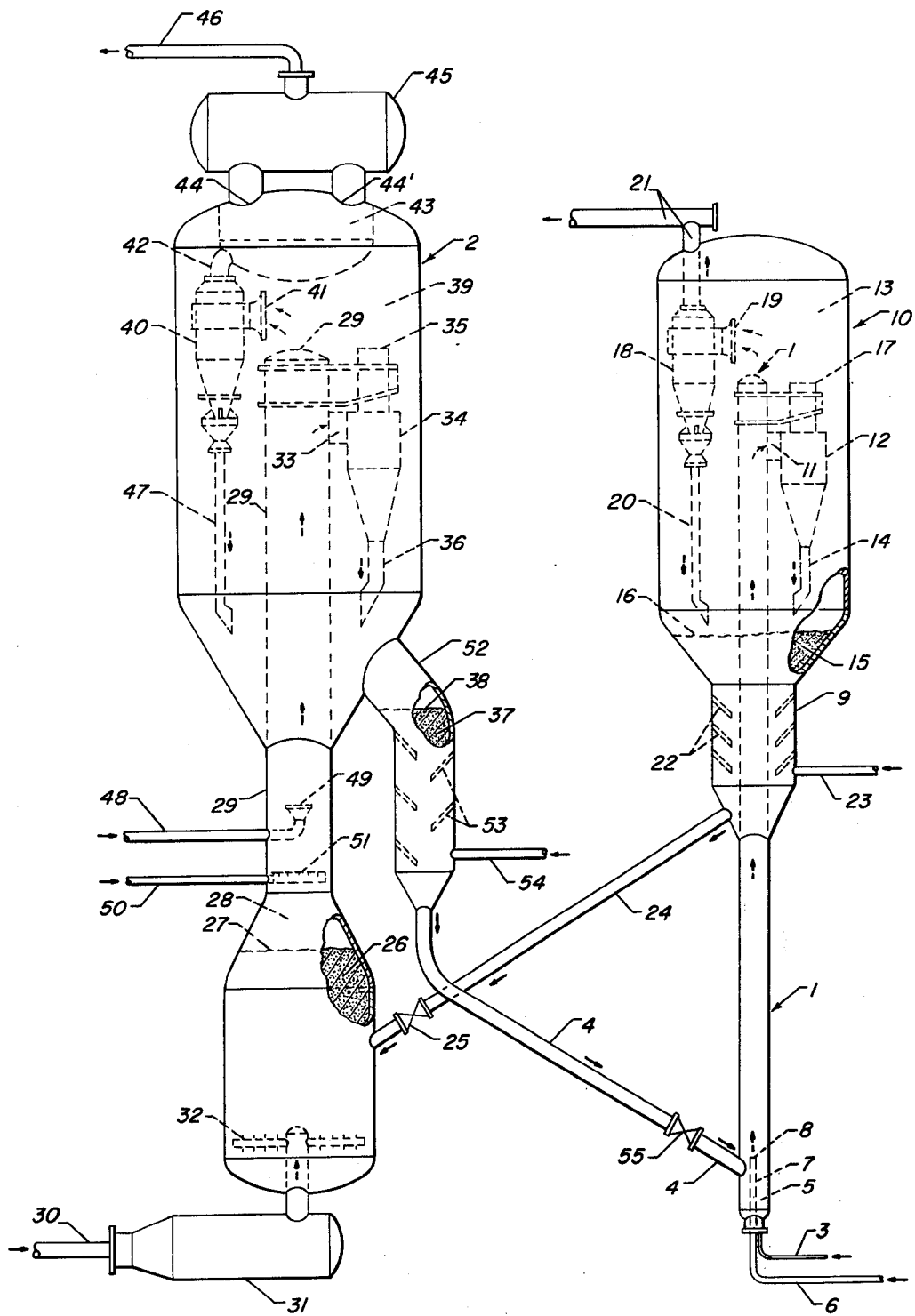

Having thus described the invention in brief general terms, reference is now made to the schematic drawing of the most specific embodiment of our invention in order to provide a better understanding of the process of the present invention. It is to be understood that the drawing is shown only in such details as are necessary for a clear understanding of the invention and that no intention is made thereby to unduly limit the scope of this invention. Various items such as valves, pumps, compressors, steam lines, instrumentation, and other process equipment and control means have been omitted therefrom for the sake of simplicity. Variations obvious to those having ordinary skill in the art of fluid catalytic cracking processes are included within the broad scope of the present invention.

FIG. 1 shows a fluid catalytic cracking process basically comprising a short-time dilute-phase quick-quench riser reaction zone 1 and a regeneration zone 2 with conduits connecting the two.

Gasoline-range feed enters the lowermost end of riser reaction zone 1 through line 3 and therein contacts freshly regenerated catalyst which enters the riser reaction zone through regenerated catalyst standpipe 4. The gasoline-range feed contacts hot freshly regenerated catalyst in the region 5 of the riser reaction zone which is below the outlet of injection pipe 7 described below. This region 5 is relatively upstream in relation to the regenerated catalyst standpipe 4. Reaction products, unreacted gasoline-range feed and catalyst then pass upward through riser 1.

Gas oil feed which may be preheated by a fired heater or system of heat exchangers not shown passes through line 6 and enters the riser reaction zone 1 through injection pipe 7 where it first contacts used catalyst at the outlet 8 of injection pipe 7. The outlet 8 is relatively downstream in relation to the regenerated catalyst standpipe 4. Conversion of the gas oil hydrocarbon feed takes place in the presence of catalyst which had previously contacted the gasoline-range feed while the mixture comprising catalyst and hydrocarbons passes upward through riser reaction zone 1 which extends vertically through spent catalyst stripper 9 and into reception vessel 10. Reaction products plus unconverted feed, if any, pass out of riser reaction zone 1 via opening 11 directly into cyclone separator 12 located in disengaging space 13 within reception vessel 10. Hydrocarbon vapors and catalyst are separated in cyclone separator 12 and separated catalyst is passed downward through dipleg 14 toward dense bed 15 which has an interface indicated at 16. Hydrocarbon vapors and any inerts leave separator 12 via outlet 17 and pass into disengaging space 13. These vapors plus any entrained catalyst then enter cyclone separator 18 through inlet 19 and catalyst and vapors are again separated with separated catalyst passing downward toward dense bed 15 through dipleg 20 and vapor passing out of cyclone separator 18 and out of vessel 10 through conduit 21. Although the drawing shows only one cyclone separator attached to riser reaction zone and one other in disengaging space 13, more than one could, of course, be employed in either or both locations as the volume and loading of the vapor stream and the desired degree of separation dictate.

Catalyst in dense bed 15, flowing in a downward direction, passes through catalyst stripper 9 over baffles 22 and is stripped of adsorbed and interstitial hydrocarbons by a countercurrent stream of stripping medium, generally steam, which enters the catalyst stripper through line 23. Stripped catalyst leaves stripper 9 through spent catalyst standpipe 24. Slide valve 25 on standpipe 24 controls the amount of catalyst flowing the standpipe.

Stripped spent catalyst passes into first dense bed 26 of regeneration zone 2 via spend catalyst standpipe 24. First dense bed 26 has a level or interface 27 which is located in a transitional region 28 positioned between first dense bed 26 and dilute phase transport riser 29. A controlled stream of fresh regeneration gas is introduced via line 30 and fresh regeneration gas heater 31 into dense bed 26 through distributing device 32 which allows the fresh regeneration gas to be more readily dispersed within the dense bed 26. Fresh regeneration has heater 31 will typically only be used during startup to assist in increasing the regeneration zone 2 temperature to near operating temperature although it may be used during normal operation. Distributing device 32 will preferably be a pipe grid arrangement although a metal plate containing holes or slots could also be used. Oxidation of the carbonaceous deposits on the spent catalyst takes place in dense bed 26 to produce partially spent regeneration gas and regenerated catalyst which are then carried out of bed 26 through the transition region 28 into dilute phase transport riser 29 wherein essentially complete CO oxidation takes place to produce spent regeneration gas and where the heat of combustion of the CO to $CO_2$ is transferred to the catalyst being transported.

Transport riser 29 is vertically positioned having its inlet at the lower portion and its outlet means 33 near its top portion. Outlet means 33 may be single or multiple openings located at or near the uppermost portion of transport riser 29 which allow regenerated catalyst and spent regeneration gas to pass out of transport riser 29. As shown in the drawing cyclone separator 34 is attached to the outlet 33 of transport riser 29. Cyclone separator 34 is used to achieve a substantial separation of spend regeneration gas and entrained catalyst which pass out of transport riser 29. Although the drawing shows only one such cyclone separator attached to the transport riser 29, it is contemplated that from one to four cyclones culd be so positioned. Spent regeneration gas, substantially free of catalyst, passes out of the cyclone separator 34 through outlet 35 while catalyst passes through dipleg 36 downward toward second dense bed 37 which has an interface indicated at 38. Optionally, cyclone separator 34 could be omitted leaving regeneration gas and catalyst exiting outlet means 35 to directly enter disengaging space 39. Some separation of regeneration gas and catalyst would be achieved but not as efficiently as with cyclone separator 34 as shown.

Cyclone separator 40 has an inlet 41 which receives regeneration gas and any entrained catalyst located in the disengaging space 39. Regeneration gas and any entrained catalyst are substantially separated from each other with the spent regeneration gas passing out of the separator 40 at outlet 42 into plenum chamber 43 and then out the plenum chamber and the regeneration zone via spent regeneration gas outlet 44 and 44'. Spent regeneration gas can then pass through steam generator 45 where part of the sensible heat of the gas can be utilized for steam generation. Spent regeneration gas will then leave steam generator 45 via outlet line 46. Catalyst separated from the regeneration gas is passed via dipleg 47 downward toward second dense bed 37.

An external combustible fluid such as fuel gas or a liquid hydrocarbon stream may be admitted to the transport riser 29 through line 48 via distributor 49. The burning of such a fluid may be necessary to assist in initial process startup or to increase the temperature within the dilute phase transport zone 29 sufficiently to initiate CO oxidaton. Additionally, a second stream of fresh regneration gas may be admitted to the transport riser 29 through line 50 via distributor 41. This fresh regeneration gas stream may be for the purpose of ensuring sufficient oxygen for the essentially complete conversion of CO to $CO_2$.

Second dense bed 37 is so positioned in relationship to the first dense bed 26 as to maintain a sufficient head of regenerated catalyst necessary to overcome any pressure drop in regenerated catalyst conduit 4 and in any equipment connected to conduit 4. Furthermore, the level 38 of catalyst within the secod dense bed 37 may be controlled as to provide the desired residence time within the bed.

The catalyst in second dense bed 37 moves in a downward direction and passes out of the regeneration zone 2 through regenerated catalyst stripper 52 which contains baffles 53. A stripping medium will be admitted through line 54 to strip in a countercurrent fashion adsorbed and interstitial regeneration gas from the regenerated catalyst as it flows downward over the baffles 53. Generally the stripping medium will be steam.

Stripped regenerated catalyst leaves stripper 52 through regenerated catalyst conduit 4 and is directed to the bottom of the riser reaction zone 1 as previously mentioned. Located on conduit 4 is control valve 55 which may be used to control the rate of withdrawal of regenerated catalyst from stripper 52. Valve 55 is typically a slide valve and is operated by a reactor temperature controller.

Figure 2:
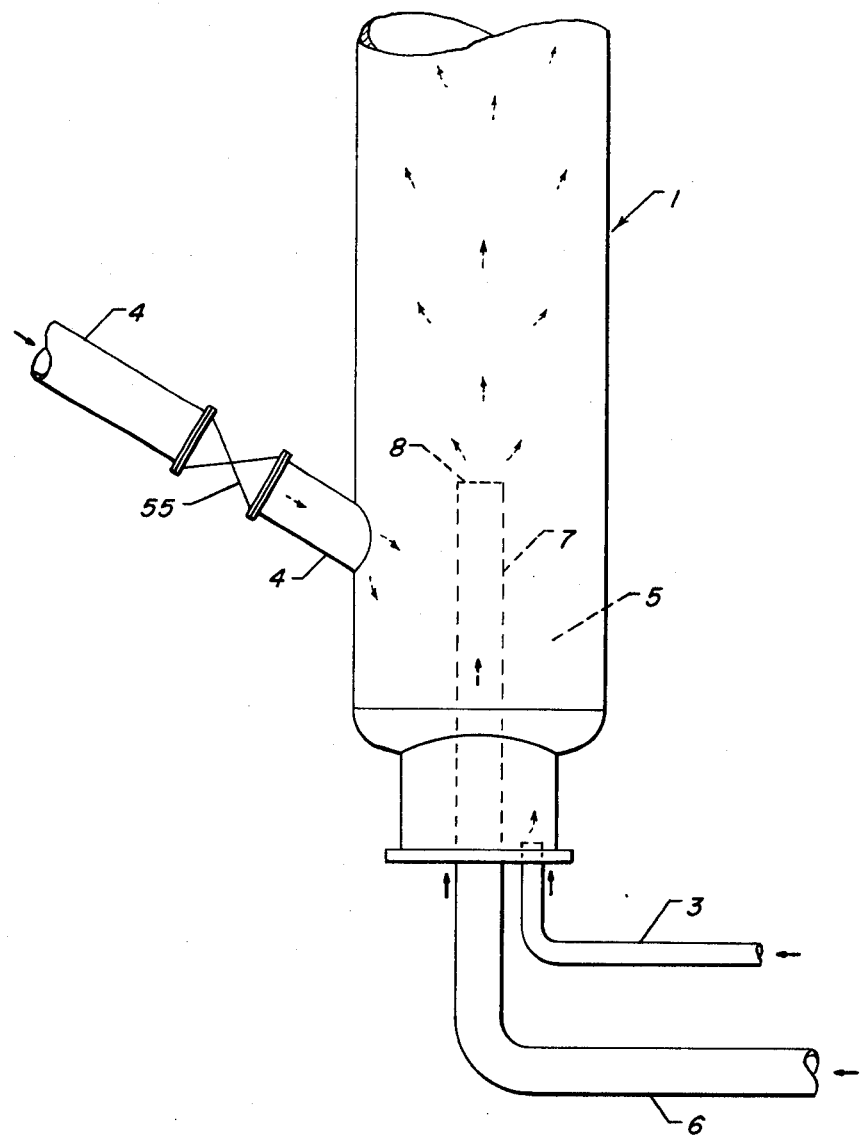

FIG. 2 shows an enlargement of the lowermost portion of riser reaction zone 1. The gasoline-range feed enters the riser reaction zone through line 3 and therein contacts and is vaporized by very hot regenerated catalyst which enters the reaction zone through regenerated catalyst standpipe 4. Selective cracking of the gasoline-range feed in the presence of the freshly regenerated catalyst takes place at conditions of high severity in region 5 of the reaction zone which is the region of the reaction zone below the regenerated catalyst standpipe 4. Although the gasoline residence time in the region is very short (less than about 0.5 sec.) the temperature and catalyst to oil ratio are high.

Gas oil feed passes through line 6 and enters the riser reaction zone 1 through injection pipe 7. The gas oil feed first contacts used catalyst at the outlet 8 located at the top of injection pipe 7. Note that the top of the injection pipe 7 is positioned at the top of regenerated catalyst standpipe 4 so that the gas oil feed contacts used catalyst in a portion of the riser reaction zone relatively downstream to the regenerated catalyst standpipe 4.

DESCRIPTION OF THE INVENTION

The term "gasoline-range feed" as used herein means any hydrocarbon stream which has a boiling range of from about 100° F. to about 430° F. Generally these feed streams will be unsuitable for use as motor fuel or motor fuel components because of their low octant rating, poor stability, high contaminant levels of sulfur or nitrogen or both or any combination of these characteristics. Examples of some of these gasoline-range feed streams include: coker naphtha, visbreaker naphtha, pyrolysis naphtha (from an ethylene operation), straight run naphtha and FCC gasoline. Some of the more desirable of these, such as straight run or FCC gasolines, could either be blended in resonable quantities directly into the refinery gasoline pool or further processed in units typically found in most refineries. The economical use of other streams such as coker naphtha for example presents more of a problem. Because of its low octane and its tendency to form gum it cannot be blended into the gasoline pool. It could be reformed in a catalytic reformer, a typical refinery process, yet because of its sulfur and nitrogen content if would require prior hydrotreating to reduce the sulfur and nitrogen to acceptable levels. Moreover, because of its exceptionally high sulfur and nitrogen content, it would require more severe (higher pressure, for example), hydrotreating conditions than those generally employed in the naphtha hydrotreater which precedes the catalytic reformer.

Faced with a disposal problem of such streams it was common practice to add them to the regular gas oil feed for the fluid catalytic cracking process. When added as part of the feed to an FCC process having a long hydrocarbon residence time, that is, a dense bed reactor system, the gasoline-range feed was overcracked and essentially converted to coke on catalyst and flow molecular weight gases. Alternatively some of these gasoline-range feeds passed through the reaction zone with little or no change in composition or quality.

With the advent of the higher-activity zeolite-containing fluid cracking catalysts, combined with reaction zone design modifications and changes in reaction zone operating conditions, it has become possible to upgrade these gasoline-range streams into more valuable products.

The zeolite-containing catalysts as compared to the older amorphous catalysts at the same operating conditions permit increased conversion with lower yields of coke because of their higher activity and lower coke selectivity. The zeolite-containing catalysts are therefore preferred for the process of the invention but the amorphous catalysts can still be employed, although perhaps at diferent operating conditions.

The higher activity zeolite-containing catalysts allow the most advantageous use of short-time dilute-phase reaction zones of type presently employed in modern FCC units. The term "short-time dilute-phase riser reaction zone" as used herein means a fluid catalytic cracking reaction zone which is characterized by the absence of a dense catalyst bed, by cocurrent dilute phase flow of catalyst and hydrocarbon feeds and by short hydrocarbon residence times. The high activity of the zeolite-containing catalysts is such that in most cases hydrocarbon residence times of less than 10 seconds are sufficient to achieve the desired degree of feed stock conversion and hydrocarbon "soak time" in dense catalyst beds is therefore not necessary. Since conversion can now be obtained in a much shorter time, secondary reactions of converted products to form coke and gas are greatly reduced.

As an additional means of avoiding or minimizing secondary reactions which lead to increased coke, and inferior product properties the process of our invention recognizes the importance of quick, positive separation of the hydrocarbon and catalyst mixture leaving the riser reaction zone to quench the reaction. Indeed, if timely separation of hydrocarbon and catalyst does not ocurr before the ocurrence of a significant amount of aftercracking, at least a portion of the selectivity advantage of the zeolite catalyst and the short-time dilute-phase riser reaction zone can be lost. The process of this invention in one embodiment requires substantially instantaneous separation of catalyst and hydrocarbon as these materials exit from the reaction zone as another means of reducing the coke yield. This separation will be achieved by separation means which, as the term is used herein, is defined as any device or method capable of effecting quick, essentially complete separation of catalyst particles from gases and hydrocarbon vapors. Typically such separation means will be cyclone separators, devices which have been used for years and whose operation and design are well known to those skilled in the art of FCC processing. Alternatively, electrostatic precipitators or cyclone separators combined with such precipitators could be used. This quick positive separation feature of the process of our invention is referred to as "quick-quench". The term "short-time dilute-phase quick-quench riser reaction zone" as used herein shall therefore mean a fluid catalytic cracking reaction zone which is characterized by the absence of a dense catalyst bed, by cocurrent dilute phase flow of catalyst and hydrocarbon, by short catalyst and hydrocarbon residence time and additionally by this quick positive separation of hydrocarbon and catalyst.

In the process of our invention a gasoline-range feed is upgraded and simultaneously a gas oil feed is cracked each in separate regions of the short-time dilute-phase riser reaction zone described above. These separate regions can be characterized as being relatively downstream or upstream from a reference point located on the reaction zone. That reference point will be the inlet of regenerated catalyst into the riser reaction zone near the lower end of the riser. Since the catalyst and hydrocarbon mixtures move upward through the reaction zone, the term "relatively downstream" will mean downstream from the regenerated catalyst inlet and the term "relatively upstream" will mean a position upstream of the same reference point.

The gasoline-range feed enters the riser reaction zone and alone contacts freshly regenerated catalyst in a relatively downstream region of the riser reaction zone which region is maintained at first cracking conditions. Generally the gasoline-range feed will be from about 0.1 to about 10 vol. % of the normal gas oil feed described below. These first cracking conditions are generally characterized by the presence of high activity (freshly regenerated) catalyst, high temperatures, high catalyst to gasoline feed ratio and short gasoline feed residence time at these conditions. Preferred temperatures will be from about 1150° F. to about 1300° F. with preferred catalyst to gasoline feed ratios being at least 75 to 1. The gasoline feed residence time will be less than about 0.5 seconds. The term "freshly regenerated catalyst" as used herein shall mean catalyst from which coke has been removed by oxidation in a regeneration zone. The term "catalyst to oil ratio" as used herein shall generally mean the ratio of the weight of catalyst entering the riser reaction zone to the weight of the particular feed entering the riser reaction zone.

The gas oil feed enters the short-time dilute-phase riser reaction zone and contacts used catalyst in a relatively downstream region of the riser which region is maintained at second cracking conditions. The terms "gas oil feed" as used herein shall mean generally any hydrocarbon feed stream which boils within the range of from about 400° F. to about 1000° F. or higher depending upon the limits set for Conradson carbon and metals such as nickel, vanadium and iron. They can range from somewhat heavier than kerosine to reduced crudes and can include recycled materials such as light cycle oil, heavy cycle oil or slurry oil which are produced by the FCC process itself. Second cracking conditions are generally not as severe as the first cracking conditions and will include a temperature in the range of from about 900° F. to about 1100° F., a gas oil feed residence time of less than about 10 seconds in the presence of used catalyst, and catalyst to gas oil feed ratio of from about 4 to about 25 to 1. The term "used catalyst" as employed herein shall mean catalyst which has previously contacted the gasoline-range feed.

The hydrocarbon vapors and catalyst pass upward through the riser reaction zone and discharge into separation means wherein essentially complete separation of hydrocarbon vapor from spent catalyst is effected. "Spend catalyst" as used herein shall mean catalyst which has contacted the gas oil feed and which has become contaminated with coke. The separated hydrocarbon vapor stream is passed from the reception vessel which generally houses the separation means and is directed to the main fractionation column wherein the stream is separated into such typical fractions as light gases and gasoline, light cycle oil, heavy cycle oil and slurry oil. Generally the fraction containing light gases and gasoline is further separated and processed in a gas concentration process located downstream of the main column to produce a $C_3$ fraction, a $C_4$ fraction (which may be combined with the $C_3$ fraction) and stable high octane $C_5+$ gasoline. The $C_3-C_4$ fraction (or fractions) contains olefins which may be alkylated with isoparaffins in an alkylation process generally associated with an FCC process, to produce stable high octane alkylate. The combination of the FCC gasoline and the alkylate produces a high quality motor fuel having good stability and high octane.

Separated spent catalyst is generally steam stripped to remove adsorbed and interstitial hydrocarbons and is then directed to the regeneration zone wherein coke is oxidized from the catalyst.

The process of our invention is demonstrated by the yield estimate for upgrading coker naphtha shown in the table below. The table shows the product distribution and gasoline produced (both FCC and alkylate) for each 1000 barrels per day (B/D) of coker naphtha. Note that 1000 B/D of coker naphtha with a research clear octane number of about 68 can be upgraded to produce about 510 B/D of FCC gasoline having an octane number of about 91. Additionally the $C_3$ and $C_4$ olefins from the FCC process when alkylated with isobutane will produce about 625 B/D of alkylate gasoline having an octane number of about 94. Thus for every 1000 B/D of 68 octane coker naphtha a total of about 1135 B/C of total gasoline with an octane of about 92.7 can be produced. Similar results can be achieved with other gasoline-range feed streams.

GASOLINE-RANGE FEED: 1000 B/D COKER NAPHTHA
API Gravity: 63.6
Research Clear (R-O) Octane Number: 68

| Products | Wt. % | API Gravity | Vol. % |
|---|---|---|---|
| $C_2$ | 9 | — | — |
| $C_3$'s | 19 | | 28.4 |
| $C_4$'s | 14 | | 17.6 |
| $C_5$ to EP | 53 | 56 | 51.0 |
| Coke | 5 | | — |
| Total | 100 | | 97.0 |

| Gasoline Produced | B/D | R-O Ocatane Number |
|---|---|---|
| FCC | 510 | 91 |
| $C_3$-$C_4$ Alkylate | 625* | 94 |
| Combined | 1135 | 92.7 |

*402 B/D of isobutane required

We have additionally discovered that the upgrading of the gasoline-range feed streams can be achieved more efficiently and easily if the temperature of the freshly regenerated catalyst contacting the gasoline-range feed can be increased. This is especially true of the more refractory gasoline-range feed streams such as straight run gasoline.

In one embodiment of the process of our invention this temperature of the regenerated catalyst is increased by essentially completely oxidizing in the regeneration zone carbon monoxide produced by the oxidation of coke and by transferring at least a portion of the heat of combustion of CO to the regenerated catalyst.

The term "regeneration zone" as used in this specification shall mean that portion of the FCC process in which coke from spent catalyst is oxidized in the presence of regeneration gas. The terms "spent catlayst" and "regenerated catalyst" have been previously defined. Spent catalyst will generally contain from about 0.5 to about 1.5 wt. % coke and regenerated catalyst will generally contain less than about 0.5 wt. % coke and, more specifically, from about 0.02 to about 0.35 wt. % coke. The term "regeneration gas" as used herein shall mean, in a generic sense, any gas which is to contact catalyst or which has contacted catalyst within the regeneration zone. Specifically the term "fresh regeneration gas" shall include oxygen-containing gases such as air or oxygen enriched or deficient air which pass into the dense bed of the regeneration zone to allow oxidation of coke on the spent catalyst therein. "Partially spent regeneration gas" shall refer to regeneration gas which has contacted catalyst within the dense bed and which contains a reduced quantity of free oxygen. Typically the partially spent regeneration gas contains water, nitrogen, oxygen, carbon monoxide and carbon dioxide. "Spent regeneration gas" shall mean regeneration gas which contains from about 100 to about 2000 ppm. carbon monoxide (generally less than about 500 ppm.) from about a few tenths up to as much as about 15 mole % free oxygen, carbon dioxide, nitrogen and water.

Regeneration zones presently employed do not completely oxidize coke to $CO_2$ but rather are operated to preclude significant CO "afterburning". The flue gas produced by the coke oxidation generally contains approximately equal amounts of CO and $CO_2$ ranging from about 8 to about 14 vol. %. Regeneration zone and regenerated catalyst temperatures produced by this manner of operation are usually in the range of from about 1,150° F. to about 1,300° F. Normally the CO as part of the flue gas is directed to a CO boiler located downstream from the FCC process and the heat of combustion is not recovered by the FCC process itself but is used to make steam.

In this embodiment of the process of our invention CO is essentially completely converted to $CO_2$ and at least a portion of the heat of combustion of CO is transferred to the regenerated catalyst in the regenerated zone. Regeneration zone and regenerated catalyst temperatures with this type of operation will now be in the range of from about 1,250° F. to 1,500° F. This hotter regenerated catalyst now contacting the gasoline range feed in the relatively upstream portion of the riser will permit more efficient upgrading of the more easily cracked gasoline feeds and will provide additional severity required for the more refractory gasoline feed streams.

In addition to benefit described above, the essentially complete combustion of CO within the regeneration zone provides other benefits. This combustion of CO within the regeneration zone essentially eliminates CO pollution of the atmosphere without the need for a CO boiler and in many instances permits either a reduction in gas oil feed preheat or higher reactor temperatures at the same preheat temperature. The higher regenerated catalyst temperature additionally benefits the cracking of the gas oil feed in the relatively downstream portion of the riser reaction zone. Because of the higher catalyst temperature a lower catalyst to gas oil ratio is required (at a constant preheat temperature) to produce a desired temperature in that portion of the riser. The coke yield is therefore reduced permitting higher recoveries of more valuable products from the gas oil feed.

The term "essentially complete combustion of CO" as used in this specification shall mean that the CO content of the spent regeneration gas leaving the regeneration zone is in the range of from about 100 to about 2,000 ppm. Generally the CO content will be less than about 500 ppm.

Generally coke oxidation is done in a single dense bed maintained in the bottom portion of a regeneration zone by limiting the superfical velocity of the incoming fresh regeneration gas to less than the transport velocity, that is, the velocity above which large amounts of catalyst would be carried out of the dense bed. Typical velocities are therefore less than about 3 feet per second with 1.5 to 2.5 being the usual range.

Provisions are made for recovering and returning to the dense bed any catalyst entrained in the flue gas effluent which passes from the dense bed. This is generally accomplished by passing the effluent flue gas containing entrained catalyst through one or more cyclone separators located in the dilute phase which is positioned above and in connection with the dense bed. The use of such cyclone separators is quite common in the art of fluid catalytic cracking and no further description of them is deemed necessary. Attempts to achieve low residual carbon levels on regenerated catalyst inventories and fresh catalyst makeup rates have been made by effecting a staged regeneration within the regeneration zone. Such staging has generally involed multiple dense beds in which coke oxidation takes place located in the bottom portion of the regeneration zone with a common dilute phase positioned above and in connection with them.

Essentially complete combustion of CO may be achieved in either a single or multistage type of regeneration zone and either may be used in the process of our invention. Regeneration zone oxidizing conditions will include a temperature within the range of from about 1,150° F. to about 1,500° F. and a pressure from about atmospheric to about 50 psig. When CO is essentially completely oxidized to $CO_2$ within the regenerator the temperature more specifically will be in the range of about 1,250° F. to 1,500° F.; when CO is not essentially completely oxidized the temperature will be in the range of from about 1,150° F. to about 1,300° F. In the type of regeneration zone in which the superficial velocity of the incoming fresh regeneration gas is limited to less than the transport velocity to maintain one or more dense beds in the bottom portion of the regeneration zone a total catalyst residence time of from about 2 to about 5 minutes will be required to achieve the desired degree of coke oxidation.

A particularly preferred regeneration zone for achieving both coke and essentially complete CO oxidation is one comprising a first dense bed, a dilute phase transport riser and a second dense bed which operate in series to produce regenerated catalyst and spent regeneration gas. Spent catalyst is passed into a first dense bed along with a fresh regeneration gas stream and coke is oxidized to produce regenerated catalyst and partially spent regeneration gas. Regeneration gas and regenerated catalyst are transported from the first dense bed to a dilute phase transport riser where essentially complete CO oxidation takes place and where the heat of combustion of the CO is transferred to the catalyst. Catalyst residence time in the transport riser is sufficiently short to preclude further substantial oxidation of any residual coke on the regenerated catalysts to produce additional CO. Catalyst and spent regeneration gas leaving the transport riser are separated by separation means such as cyclone separators and the regenerated catalyst is passed to a second dense bed where the catalyst can be stripped of entrained regeneration gas and from which regenerated catalyst is returned to the reaction zone.

Since it is not intended in this regeneration zone that catalyst remain in the first dense bed, the superficial velocity of the fresh regeneration gas into that bed is not limited to the transport velocity. In the first dense bed superficial velocities will be in the range of about 3 to 10 feet per second so that catalyst can be carried from the first dense bed into the dilute phase transport riser. Velocities contemplated for the dilute phase transport riser will be in the range of about 10 to 25 feet per second.

Since velocity is not only not limited to the transport velocity but is in fact 2 to 3 times the critical velocity, dramatic catalyst inventory reductions can now be achieved. This is because regeneration zone catalyst inventories are directly related to superficial velocities employed within the regeneration zone. Catalyst inventories using the process of this invention will be about 40 to 60 percent of those of present single or multistage regeneration processes. A moderately sized FCC process of the type presently in industry use will contain about 150 tons of catalyst. By using the regeneration zone of this embodiment of the process of our invention a refiner could save the initial investment represented by at least 75 tons of catalyst. Catalyst makeup rates required to make up losses and maintain activity will also be reduced because such rates tend to be a percentage of the total inventory.

Better solid-gas contact and reduced residence times of both catalyst and regeneration gas are other advantages of the higher velocity. Higher velocities will produce more turbulent flow with better mixing hence will result in more efficient regeneration. Because of this better gas-solid contact, along with the higher oxygen patrial pressure and higher temperature, the rate of coke combustion will be increased and catalyst residence times can therefore be reduced. Catalyst residence times can be reduced from the present 2 to 5 minutes to less than 2 minutes. With shorter catalyst exposure time to high temperatures, catalyst activity will be prolonged and reduced fresh catalyst makeup rates can result.

From the standpoint of savings to be effected another important result of shorter catalyst residence time is that it now allows the steam stripping of flue gas components from regenerated catalyst thereby permitting a reduction of the FCC process.

Oxidizing conditions employed within the first dense bed will include a temperature within the range of from about 1,150° F. to about 1,400° F., a superficial gas velocity within the range of about 3 to about 10 feet per second and a catalyst residence time of less than about 2 minutes. Conversion conditions within the dilute phase transport riser will include temperatures within the range of about 1,250° F. to about 1,500° F. and a superficial gas velocity in the range of from about 10 to about 25 feet per second.

I claim as my invention:

1. A fluid catalytic cracking process for simultaneously cracking a gas oil feed and upgrading gasoline-range hydrocarbon feed which process comprises the steps of:
   a. contacting the gasoline-range feed with freshly regenerated catalyst in a relatively upstream portion of a short-time dilute-phase riser reaction zone which portion is maintained at first catalytic cracking conditions including a gasoline-range-feed residence time of less than about 0.5 seconds in the presence of said catalyst, a temperature within the range of about 1,250° F. to about 1,500° F. and a catalyst-to-gasoline-range-feed weight ratio of at least about 75 to 1;
   b. contacting the gas oil feed with used catalyst in a relatively downstream portion of the short-time dilute-phase riser reaction zone which portion is maintained at second catalytic cracking conditions including a gas-oil residence time of less than about 10 seconds in the presence of used catalyst, a temperature in the range of from about 900° F. to about 1,100° F. and a catalyst-to-gas-oil-feed weight ratio of from about 4 to about 25 to 1;
   c. passing catalyst and feed streams in admixture through the riser reaction zone to produce spent catalyst, containing coke, and product components including gasoline;
   d. discharging the mixture from said reaction zone into cyclone separators to effect the separation of spent catalyst from product components and any unreacted feed;

e. recovering product components and any unreacted feed;

f. passing spent catalyst to a regeneration zone maintained at oxidizing conditions including the presence of fresh regeneration gas, a temperature within the range of from about 1,250° F. to about 1,500° F., a pressure from about atmospheric to about 50 psig. and a catalyst residence time of from about 2 to about 5 minutes and therein oxidizing at said oxidizing conditions coke from spent catalyst and CO, resulting from coke oxidation, to produce freshly regenerated catalyst and spent regeneration gas, said oxidizing conditions being sufficient to substantially completely oxidize said CO to $CO_2$ and said CO oxidation being effected in contact with said freshly regenerated catalyst;

g. transferring at least a portion of the heat of CO combustion to regenerated catalyst thereby heating said catalyst to a temperature of from about 1,250° F. to about 1,500° F.; and, h. returning heated regenerated catalyst to said reaction zone of step (a) above.

2. The process of claim 1 further characterized in that the gasoline-range hydrocarbon feed is selected from the group consisting of coker naphtha, visbreaker naphtha, pyrolysis naphtha, straight-run gasoline and FCC gasoline.

3. The process of claim 1 further characterized in that said regeneration zone comprises a dense-phase catalyst bed and a dilute phase positioned above and in connection with it.

4. The process of claim 1 further characterized in that coke and CO oxidation occur in a dense-phase catalyst bed.

5. The process of claim 1 further characterized in that said gasoline-range feed is from about 0.1 to about 10 vol. % of the gas oil feed.

* * * * *